(12) United States Patent
Clark et al.

(10) Patent No.: US 8,484,147 B2
(45) Date of Patent: Jul. 9, 2013

(54) PATTERN MATCHING

(75) Inventors: Christopher F. Clark, Berlin, MA (US); Vinodh Gopal, Westborough, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 12/340,360

(22) Filed: Dec. 19, 2008

(65) Prior Publication Data

US 2010/0161536 A1      Jun. 24, 2010

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

2004/0162826 A1 *   8/2004   Wyschogrod et al. ............ 707/6

OTHER PUBLICATIONS

'Scalable pattern matching for high sped networks': Clark, 2004, 12th annual IEEE symposium on field programmable custom computing machines.*
'Modeling the data dependent performance of pattern matching architectures': Clark, 2006, ACM, FPGA06, 1-59593, pp. 73-82.*
'A unified model of pattern matching circuits for field programmable gate arrys': Clark, 2006, Georgia Institute of Technology.*
'Design of efficient FPGA circuits for matching complex patterns in network intrusion detection systems': Clark, 2003, Georgia Institute of Technology.*
A V Aho, M J Corasick "Efficient string matching: an aid to bibliographic search" Communications of the ACM, 18 (6):333-340, 1975.

* cited by examiner

*Primary Examiner* — Kakali Chaki
*Assistant Examiner* — Peter Coughlan
(74) *Attorney, Agent, or Firm* — Grossman, Tucker, Perreault & Pfleger, PLLC

(57) ABSTRACT

A method and apparatus to perform pattern matching is provided. The apparatus includes a first storage to store data representing a first set of pattern components, and a second storage to store data representing a second set of pattern components each corresponding to one or more components of the first set of pattern components. A first pattern matcher is configured to detect in an input stream a first component of one or more patterns and to generate a signal indicative of the detection of the first component. A second pattern matcher is configured to receive the signal from the first pattern matcher and to detect if a second component of the one or more patterns of the set of patterns immediately follows the first component in the input stream.

15 Claims, 6 Drawing Sheets

PATTERN MATCHING

BACKGROUND

This description relates to matching patterns in digital data.

The widespread use of Internet applications coupled with the availability of system viruses and other malicious software has led to the growing need for network security. In some applications, firewalls and dedicated intrusion detection/prevention systems (IDS/IPS) are used to perform deep packet inspection to provide protection from network attacks. Some IDSs, for example, operate by first checking packet headers for certain types of attacks, then classifying the network packets, and subsequently performing pattern matching on packet payload against a known database of patterns.

Some approaches to pattern matching first transform a database of fixed strings/regular expressions into an abstract machine, such as a nondeterministic finite automaton (NFA) or a deterministic finite automaton (DFA). In some examples, a representation of the resulting abstract machine is stored in a memory and interpreted by application-specific hardware, which reads the input characters and detects the patterns in the database.

Integrating hardware accelerators in IDSs can be useful in improving the speed and efficiency of pattern matching. For large pattern databases, however, constructing a DFA can sometimes impose a memory penalty too great for building such an accelerator. An NFA may have a smaller memory requirement, but it may not be suitable for high-speed hardware implementations due to the non-deterministic nature of transitions and back-tracking on the data that is constructed by traditional approaches.

DETAILED DESCRIPTION

Pattern matching is useful in many applications, including the production of syntax highlighting systems, data validation, virus scanning and network intrusion detection. An embodiment of a high-performance pattern match engine described below uses a hybrid structure in which a pattern database is transformed into separate components with distinct characteristics. Each pattern in the database is specified, for example, as a specific string or as a regular expression. In some examples, one component uses a deterministic finite-state automaton (DFA) and another component uses a non-deterministic finite-state automaton (NFA).

Figure 1:
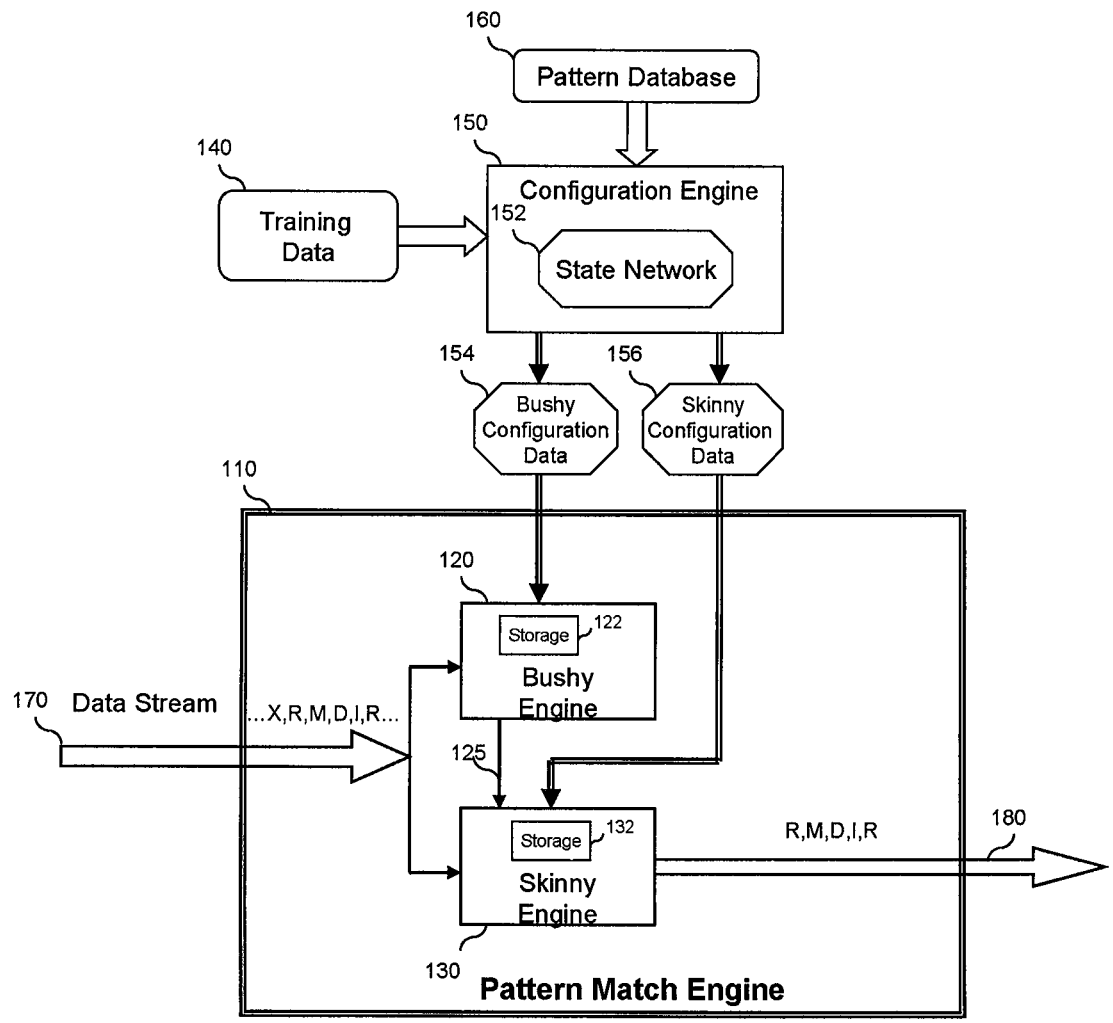
FIG. 1 is a schematic diagram of a pattern match engine.

Referring to FIG. 1, one embodiment of a pattern match engine 110 includes a "bushy" engine 120 and a "skinny" engine 130, each configured to perform complementary functions upon receiving data stream 170. (Note that the terms "bushy" and "skinny" are used as identifiers and should not be construed to necessarily describe any particular characteristics of these engines.) In some examples, very generally, the bushy engine 120 scans each byte of the data stream 170 to detect whether it contains a component of a pattern of interest, for example, a prefix of one or more patterns in a set of predefined patterns. Upon detecting such a pattern component, the bushy engine 120 notifies the skinny engine 130 of the detection result through data line 125. The skinny engine 130 then determines whether a full match to a predefined pattern exists, for example, by identifying if any one of a set of pattern components corresponding to the pattern component detected by the bushy engine immediately follows that detected component in the data stream 170. In some examples, the skinny engine determines whether a suffix of a predefined pattern immediately follows the prefix of that pattern detected by the bushy engine.

As an operational example, consider the task of detection of the predefined character sequence (string) "RMDIR". In this example, the bushy engine 120 is configured to detect a prefix "RM" of this string by scanning each character of data stream 170 " ... XRMDIR ... ." When prefix "RM" is found, the bushy engine 120 signals the skinny engine 130 to commence scanning the data stream 170 to determine whether the combination of characters (immediately) following the prefix "RM" matches string "DIR." Upon a successful match, the skinny engine 130 signals the match of the string "RMDIR" through data line 180, for example, to subsequent engines in a cascade of pattern matching engines. If the following characters do not match "DIR", the skinny engine 130 stops scanning upon failure of the match and idles until receiving the next signal of action through line 125 from the bushy engine 120.

A number of alternative approaches to configuring the bushy and skinny engines can be used, for example, according to the particular pattern components they are responsible for detecting and according to the techniques implemented to detect those pattern components.

In some examples, a configuration engine 150 uses domain knowledge that includes a pattern database 160 of known patterns of relevance to determine configuration data 154, 156 for the engines. In some examples, the configuration engine 150 first translates of the set of predefined patterns represented in the pattern database 160 into a state network 152, in which a set of states are interconnected by transitions. Each transition is associated with an element of the predefined patterns, for example, a character or a byte. In some examples, the state network 152 is an NFA representation of the predefined patterns, where multiple states can be reached for any particular input. In other examples, the state network is a DFA, where any particular input determines a specific single state that is reached in the network. The translation of the pattern database into the state network representation can use any of a number of conventional techniques, which may include one or more of translation of the pattern database into an NFA, conversion of an NFA to a DFA, and optimization of an NFA or DFA. For example, the translation process may involve translation of the pattern database to an NFA, optimization of the NFA, and conversion of the NFA to a DFA. After translation of the pattern data base to the state network, the configuration engine 150 partitions the state network 152 into to network components, a "bushy" network and a "skinny" network. (Again, the terms "bushy" and "skinny" are used as identifiers without any required connotation of characteristics.) Alternative approaches to partitioning the state network are described fully below. In some examples, the bushy network is essentially a DFA network, in which, for each pair of state and input character, the next possible state in the bushy network is uniquely determined. The skinny network, on the other hand, can be represented as one or more of a network of DFA, NFA, or other types and is composed of skinny states associated with the remaining portions, for example, suffixes of one or more of the predetermined patterns. Different examples of the skinny engine are compatible with different types of representations of the skinny network.

One approach to partitioning the state network 152 effectively forms a border line that separates the bushy states from the skinny states. The configuration engine 150 uses a state selection criterion to determine this border. In different examples, different state selection criterion are used.

In some examples, the state selection criterion used in partitioning the states uses a degree of involvement/performance of each state that is likely to occur in a real (or simulated) network environment. One approach to this makes use of a characterization of the data stream that will be processed, in some examples, in the form of training data 140, which is representative (e.g., in a statistical sense) of the data stream that will be processed. More specifically, the configuration engine 150 receives the set of training data 140 (for example, network data that includes suspicious strings representative of the actual network environment the pattern match engine 110 will reside), and tests the performance of matching the training data against the state network 152 to identify a degree of involvement of each of the states in the state network 152. For example, the degree of involvement may be a frequency of visiting each of the states or visiting each of the transitions in the state network 152. In some examples, the bushy network is formed by selection of a connected group of most-frequently-visited states as bushy states. The less-frequently-visited states are then grouped as skinny states. The frequency of visits may be determined based on a measure of the aggregate running time spent on each state or a measure of the number of transitions advanced from each state during the test.

In some examples, size of the bushy network is constrained, for example, according to resources available to the bushy engine. One resource is a memory resource. For example, each state that is included in the bushy network requires a fixed or a state-dependent amount of storage. If the total storage for the states in the bushy network is limited, then the selection of the group for bushy states is constrained as a whole. In some examples, the resource may be a computational resource, for example, taking into account a variable processing or memory access speed required to process the representative input.

In some examples, the state selection criterion is based on characteristics of the states. For example, states with large numbers of output transitions may be preferentially selected for the bushy network. Criteria based on the characteristics of the states may be used on their own, or in combination with criteria that are based on the expected input characteristics, such as represented by the training data.

In some examples, the state network is divided into bushy and skinny regions based on the relative concentrations of transitions at each state.

Once the bushy and skinny states are identified by the configuration engine 150, the configuration engine 150 provides the pattern match engine 110 with bushy configuration data 154 and skinny configuration data 156 for use in configuring corresponding circuit components into the bushy engine 120 and the skinny engine 130, respectively. The bushy configuration data 154 includes the set of bushy states and instructions to configure the bushy engine according to the bushy states. Similarly, the skinny configuration data 156 includes the set of skinny states and instructions to configure the skinny engine according to the skinny states. The bushy engine 120 and the skinny engine 130 include storage 122 and 132, respectively. In some examples, the bushy engine 120 includes logic circuitry that is driven by a table in the storage 122 that represents the state network 152; in some other examples, the skinny engine 130 includes a processor that is configured according to data or instructions in its storage 132.

In some examples, an advantage of separating the bushy engine 120 from the skinny engine 130 is that each engine can be configured and optimized individually. For example, the bushy engine 120 can be optimized for speed and high fanout operations, and configured such that the speed of the bushy machine is the dominant factor in overall performance of the pattern match engine 110. The skinny engine 130, on the other hand, can be optimized for space and low fanout operations, and configured such that the memory size of the skinny machine is the dominant factor in total memory consumption. As the optimization problem is divided into distinct regions that is appropriate for the type of optimization to be implied, both the speed and the efficiency of the pattern match engine 110 can be greatly improved.

Figure 2:
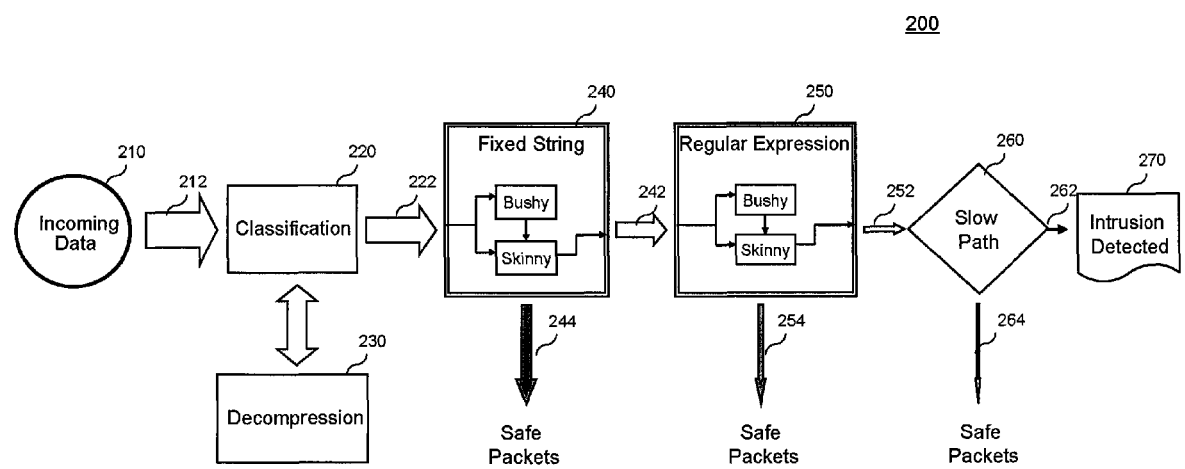
FIG. 2 is a schematic digram of one application of the pattern match engine in a network detection system.

FIG. 2 illustrates one application of the pattern match engine 110 in a networking context. Here, multiple instances of the pattern match engine 110 can be implemented in a cascade fashion and in combination with other processing engines in an intrusion detection system 200 configured to filter network traffic and identify potential attacks.

In this example, incoming data 210 is first processed by a classification engine 220, which classifies network packets 212 in the incoming data 210 and identifies packets of interest that will be later measured against a known database of patterns. Here, a "packet" refers generally to a unit of data, without intending any connotation with that a particular protocol or type of protocol used to communicate the data. The classification engine 220 can perform several quick checks to determine, for example, the type of potential attacks a network packet may be associated with, for example, by identifying the location (e.g., HTTP servers or FTP servers) that the traffic is coming from and/or going to. In some cases, if the packet contains compressed data, classification is performed after data has been decompressed by a decompression engine 230.

After classification, network packets 222 are processed by several processing engines that together determine whether an intrusion or virus exists. In one embodiment, these processing engines include one or more of a fixed string engine 240, a regular expression engine 250, and a slow path engine 260. During processing, packets are passed down to a subsequent engine only if a match occurs. Thus, successively fewer packets are processed at each stage. Each of the fixed string engine 240 and regular expression engine 250 has a bushy part and a skinny part configured based on the architecture of the pattern match engine 100. The functionalities of these engines are described in greater detail below.

The fixed string engine 240 receives network packets 222 from the classification engine 220 and searches for one or more pre-defined fixed strings (e.g., patterns without wildcards or variable repetitions) that are indicative of an attack. Examples of such fixed strings include "login," "root," and "dir" that commonly appear in network attacks. The bushy part of the fixed string engine 240 detects, for example, prefixes such as "lo-" and "ro-," whereas the skinny part identifies suffixes such as "-gin" and "-ot." A packet containing none of the predefined fixed strings is considered to be a safe packet 244, and is subsequently routed to its planned destination. Since most traffic is not an intrusion, only a small portion of the traffic is identified as potential attacks 242 to be processed in the regular expression engine 250.

The regular expression engine 250 receives packets of potential attacks 242 and performs a second level of filtering to identify strings of higher relevance. For example, a packet containing "login" may not necessarily be an attack, but certain kinds of "login," such as "login root" or "login administrator" are more likely to be indicative of attacks. The regular expression engine 250 therefore identifies packets 252 that contain pre-defined regular expressions (e.g., patterns with wildcards or variable repetitions) using its bushy and skinny part, and passes the remaining traffic as safe packets 254.

The slow path engine 260 makes the final determination, for example, using software specified in a high-level programming language (e.g., C), to dismiss a few exceptions based on the location of the packets 252 and the result of pattern matching. Once an intrusion has been confirmed, the slow path engine 260 is also responsible for sending off messages 270 to subsequent engines, for example, to engines that handle the network intrusion.

In some intrusion detection systems, a majority of the heavy workload occurs in the fixed string engine 240 and/or the regular expression engine 250. Using the hybrid architecture described above in one or both of these two engines allows hardware accelerators to be integrated. Therefore, a system of high efficiency can be achieved. Further, partitioning the problem of pattern matching into distinct encoding regions (e.g., bushy/skinny) allows each region to be optimized locally. This method is compatible with systems that have a large number of memories of increasing sizes and latencies. The method also provides a configurable framework to solve various types of pattern matching problems (e.g., fixed strings and regular expressions) in a scalable and flexible manner.

Figure 3A:
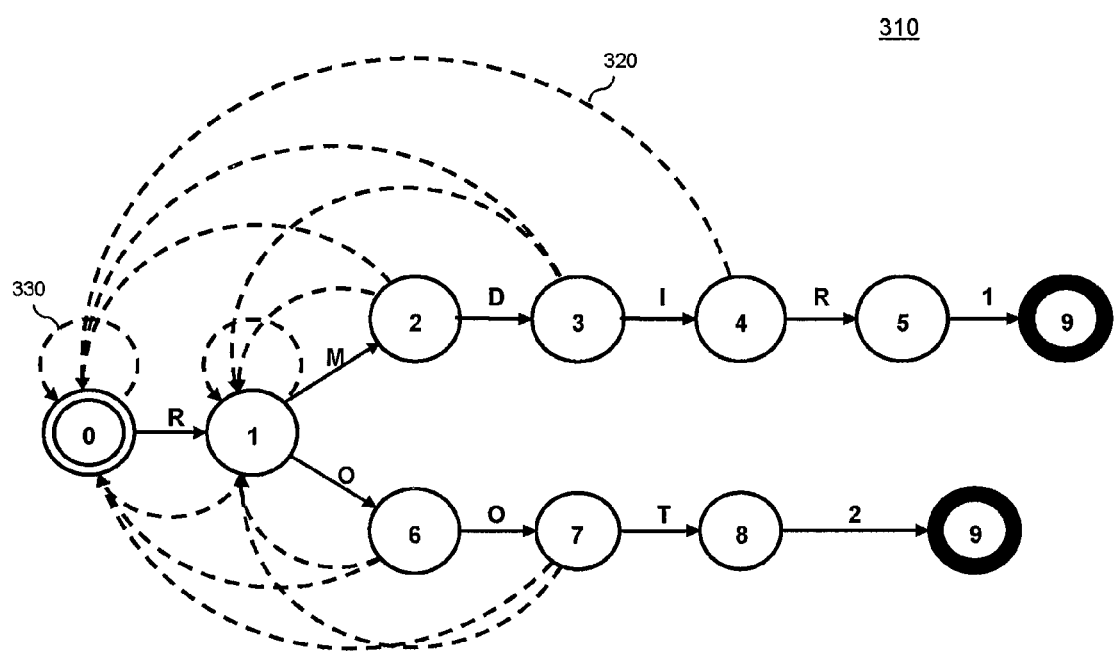
FIG. 3A is a graph of a finite state network of an Aho-Corasick engine.
Figure 3B:
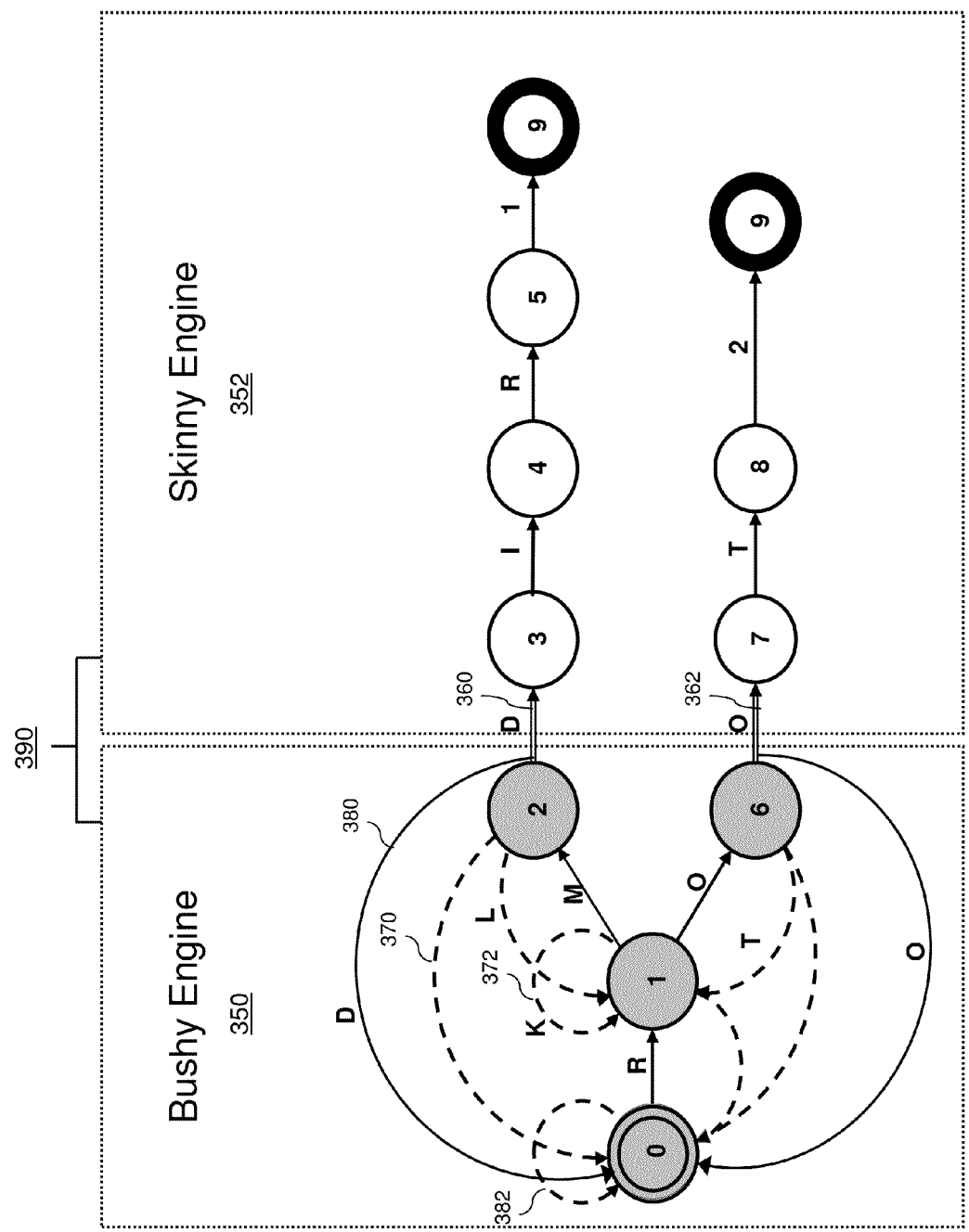
FIG. 3B is a graph of a finite state network of a bushy-skinny engine.

Referring to FIGS. 3A and 3B, one implementation of the bushy and skinny engines 120 and 130 are further illustrated below in comparison with a conventional Aho-Corasick engine in the form of a finite state network.

FIG. 3A shows a conventional Aho-Corasick engine that performs string matching. Briefly, in a state network 310, circles represent "states," solid arrows represent "forward transitions," and dashed arrows represent "back-tracking transitions" or "failure transitions". State 0 on the left (shown with two concentric rings) is referred to as a start/root state where execution begins. State 9 on the right (shown with one thick ring) is referred to as a final/accepting state. Execution starts by following or taking transitions, advancing from the start state into consecutive states.

In this example, most transitions are labeled with a corresponding character, which indicates that the transition is only taken if the engine is in the state on the left of the arrow and the input contains the character specified in the transition. Transitions into the final states are labeled with numbers, for example, "1" and "2." These numbers indicate which pattern the final state matched. For instance, given an input string "RMDIR," the engine takes transitions from state 0→1→2→3→4→5, and ends at final state 9, indicating that a type-1 match is found. If the input character does not match the character specified in the transition, the engine then takes a failure transition following a dash arrow back to a state where the arrow points. For instance, given an input string "RMDIX," the engine takes transitions from state 0→1→2→3→4, and fails at state 4 where it takes failure transition 320 back to state 0. Failure transitions that direct the engine to states other than the root state generally represent mismatches that can be a partial match to another starting point. Loop transition 330 around root state handles the characters not present in the patterns.

In practice, the beginning states in a state network are often involved with a large number of transition branches, including both forward transitions and back-tracking failure transitions. For example, state 0 may be linked with as many as 200 transitions, and state 1 with 120 transitions. As the engine advances forward, the number of branches associated with each state declines progressively, and the states deep down the line (e.g., state 5) may be involved with just one or several branches.

FIG. 3B shows a bushy-skinny engine 390 that partitions the state network 310 into two distinct regions that are respectively associated with bushy engine 350 and skinny engine 352. In this example, the bushy engine 350 includes states 0, 1, 2, and 3 (shown in dark circles) in which transitions are highly concentrated. The rest of the states, including states 3, 4, 5, 7, 8, 9, are allocated into the skinny engine 352 that has a relatively small number of forward and back-tracking transitions. Transitions 360 and 362 that advance from the bushy to the skinny engine are referred to as border transitions.

Here, back-tracking transitions that begin from states in one engine only end at states in the same engine. More specifically, there is no cross-border back-tracking transition such as 320 (in FIG. 3A) that would start from state 4 back to state 0. Within the bushy engine, there can be many back-tracking and loop transitions such as transitions 370 and 372. Depending on the implementation, the skinny engine may also have back-tracking transitions such as one from state 4 to state 7 (not shown).

During operation, both the bushy and skinny engines 350 and 352 accept the entire input string. The bushy engine checks every character in the input to find the prefixes of the predefined strings. Once a prefix (e.g., "RM") is detected, the bushy engine 350 signals the skinny engine 352, for example, by passing the state number "2" of the end character of the prefix. Upon receiving the signal, the skinny engine 352 starts checking the characters immediately subsequent to "M" to seek a full match. If the transition fails before reaching final state 9, the skinny engine 352 drops this line of search unless there is a failure transition that directs it to a different state in the skinny engine.

The bushy-skinny engine provides parallelism between the bush and skinny engines. More specifically, in some examples, the bushy engine is designed to continuously check every character in the input string regardless of the state of the skinny engine. For example, when prefix "RM" is identified and the skinny engine relays the search further down a branch, the bushy engine transits from state 2 either back to state 0 through transition 380 or to another state if there are other failure transitions (not shown), and continues to check input characters.

Table 1 below shows one example of input string "MROOT" being processed in different manners in the Aho-Corasick and bushy-skinny engines. The Aho-Corasick engine starts in state 0 at character "M." Upon receiving characters "R," "O" "O" and "T," the Aho-Corasick engine sequentially advances toward states 1, 6, 7, and 8, one state at a time. In the bushy-skinny case, the bushy engine also starts in 0, whereas the skinny engine starts in an "idle" or default state. As soon as the bushy engine finds prefix "RO" and sends the skinny engine a signal of action, the skinny engine begins to check the remaining characters and advances from state 7 to state 8, and eventually detects that this input contains a type-2 match. In parallel, the bushy engine takes transition 380 back to state 0, and loops in state 0 through transition 382 during the next two characters "O" and "T."

TABLE 1

Comparison of Aho-Corasick with Bushy-Skinny

|   | Aho-Corasick (state) | Bushy (state) | Skinny (state) |
|---|---|---|---|
| M | 0 | 0 | — |
| R | 1 | 1 | — |
| O | 6 | 6 | — |
| O | 7 | 0 | 7 |
| T | 8 | 0 | 8 |

Note that the above examples are highly simplified cases. In real applications, there can be thousands of states and millions of transitions. In addition, the states may have a widely varying number of transitions. For example, a state can have as many distinct transitions as there are characters in the character set (256 for ASCII).

Figure 4:
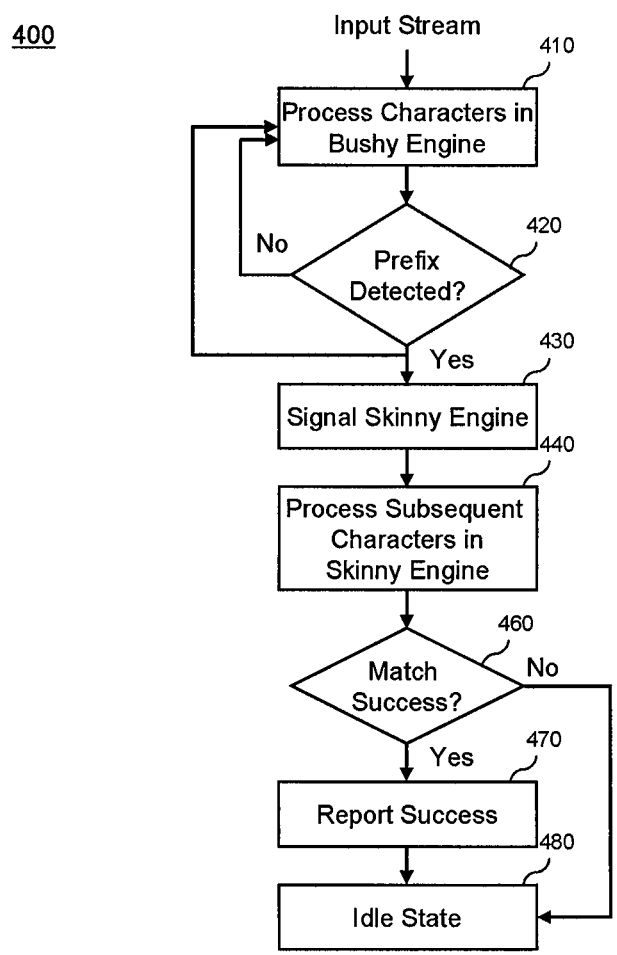
FIG. 4 is a flow chart of an exemplary process of pattern matching by the bushy-skinny engine of FIG. 3B.

Referring to FIG. 4, one exemplary process of pattern matching with reference to FIG. 3B is further illustrated in a flow diagram 400. At block 410, the bushy engine receives input stream to detect whether it contains a first portion (e.g., prefix) of one or more strings of a set of predefined strings. Upon detection of the first portion, the bushy engine signals the skinny engine of the detection result (at block 430), including, for example, the state associated with the last character of the detected portion. The skinny engine then proceeds, at block 440, to process subsequent characters in the input stream to determine whether a full match to a predefined string exists. Upon identification of a full match (i.e., the skinny engine reaches an accepting state), the skinny engine reports success in block 470 and outputs the identified string to subsequent engines. If skinny engine fails at an intermediate state, it returns to an idle/default state and waits for next signal from the bushy engine (block 480).

In some embodiments, the bushy engine is configured in a manner similar to an optimized DFA where, for each pair of state and input character, the next possible state is uniquely determined. The skinny engine can be configured similar to an optimized NFA where, for each pair of state and input character, multiple states may be activated in parallel.

Depending on the implementation, the skinny engine can be configured to handle strings in a parallel or serial fashion. For example, transition branches that have been triggered by the bushy engine may run in parallel in the skinny engine, or alternatively, be queued to run only one at a time.

Although the above bushy-skinny engine is described above primarily in the context of handling fixed strings, the general approach also applies to cases of regular expressions. Referring again to FIG. 3B, for example, with proper modifications such as adding a loop transition around state 8 (not shown), the bush-skinny engine can identify regular expressions such as "ROOT*," where "*" represents 0 to N number of repetitions of character "T."

Processors that are configured using the hybrid-architecture described above can achieve efficient performance on string-matching, regular expression, and other types of pattern matching algorithms. Further, without the requirements of custom logic or expensive multi-ported memories, such processors can achieve processing speeds comparable to a full DFA implementation while using memory comparable to an NFA implementation.

Figure 5:
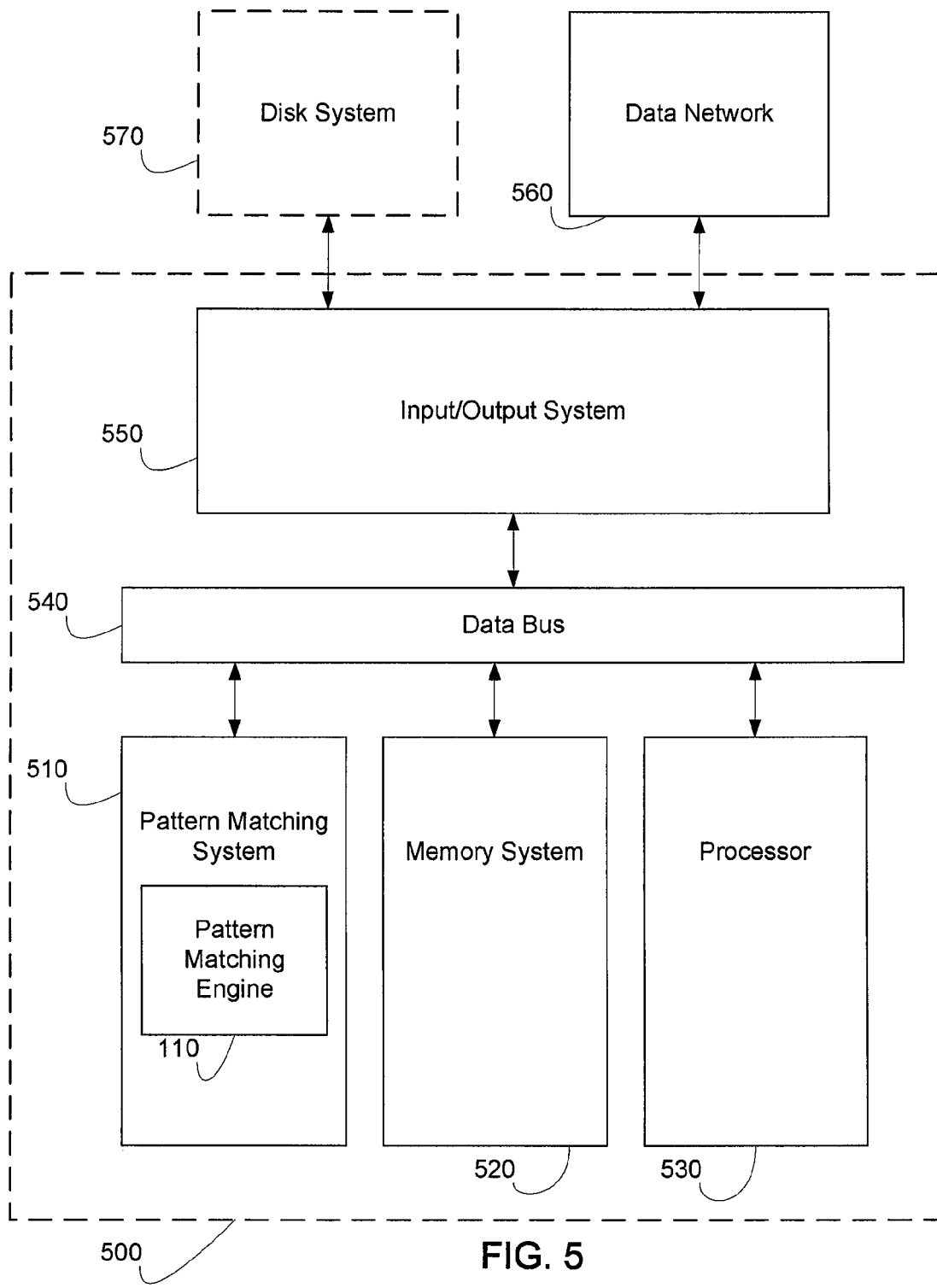
FIG. 5 is a block diagram of a system that includes a pattern matching system.

Referring to FIG. 5, in some embodiments, a pattern matching system 510, which includes one or more pattern matching engines 110 as described above, is integrated into a data processing device 500. The device also includes a processor 530 and a memory system 520, that are coupled to the pattern matching system 510 over a data bus 540. The device also includes an input/output system 550 coupled to the bus. The input/output system 550 provides a means for accepting data to be processed with the pattern matching engine, and to provide results of the pattern matching. In some embodiments, the device 500 is integrated into a single integrated circuit. In some embodiments, the device is coupled through the input/output system to a data link of a data network 560 (e.g., to a physical Ethernet data link). In some embodiments, the input/output system is coupled to a disk system 570, which may provide a source of data for pattern matching and/or a destination for results of the pattern matching. The data system 570 may include one or more storage devices. A storage device may be, for example, a disk drive, Digital Video Disk (DVD) drive, Compact Disk (CD) drive, Redundant Array of Independent Disks (RAID), tape drive, or other storage device. The input/output system may communicate with the storage device over a storage protocol interconnect using a serial storage protocol such as, Serial Attached Small Computer System Interface (SAS) or Serial Advanced Technology Attachment (SATA).

As used in embodiments described herein, a "circuit" or "circuit component" may comprise, for example, singly or in any combination, hardwired circuitry, programmable logic circuitry, state machine circuitry, and/or firmware that stores instructions executed by programmable logic circuitry. It should be understood at the outset that any of the operations and/or operative components described in embodiments herein may be implemented in software, firmware, hardwired circuitry and/or any combination thereof.

The techniques described herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

Method of the techniques described herein can be performed by one or more programmable processors executing a computer program to perform functions of the embodiments by operating on input data and generating output. Method can also be performed by, and apparatus of the embodiments can be implemented as, special purpose logic circuitry, e.g., an FPGA (field programmable gate array) or an ASIC (application-specific integrated circuit). Modules can refer to portions of the computer program and/or the processor/special circuitry that implements that functionality.

It is to be understood that the foregoing description is intended to illustrate and not to limit the scope of the invention, which is defined by the scope of the appended claims. Other embodiments are within the scope of the following claims.

What is claimed is:

1. An apparatus comprising:
a first pattern match engine including
storage for data representing a set of patterns, including a first storage for data representing a first set of pattern components, and a second storage for data representing a second set of pattern components, each pattern of the second set of patterns corresponding to one or more components of the first set of pattern components, wherein the data representing the set of patterns includes data representing a finite state network that corresponds to the set of patterns, the data representing the finite state network further including first data representing a deterministic finite automaton (DFA) network that corresponds to the first set of pattern components;

a first pattern matcher configured to detect in an input stream a first component of one or more patterns of the set of patterns according to the data representing the first set of pattern components, and to generate a signal indicative of the detection of the first component;

a second pattern matcher configured to receive the signal from the first pattern matcher and to detect, according to the data representing the second set of pattern components, if a second component of the one or more patterns of the set of patterns immediately follows the first component in the input stream; and a configuration module configured to generate the data representing the finite state network and partition the finite state network into a first and a second network, the first network having first data corresponding to the first set of pattern components and the second network having second data corresponding to the second set of pattern components;

wherein the configuration module partitions the finite state network into the first and second networks based, at least in part, on selection criterion of a first set of states and a second set of states associated with the first and second data, respectively.

2. The apparatus of claim 1, wherein the data representing the finite state network further includes:

second data representing a nondeterministic finite automaton (NFA) network that corresponds to the second set of pattern components.

3. The apparatus of claim 2, wherein the second pattern matcher is configurable according to the second data.

4. The apparatus of claim 1, wherein the first pattern matcher is configurable according to the first data.

5. The apparatus of claim 1, wherein the configuration module is further configured to generate configuration data for the first and second pattern matchers according to the first and second network, respectively.

6. The apparatus of claim 1, further comprising a sequence of pattern match engines, the sequence of pattern match engines including:

the first pattern match engine configured to receive a data stream and detect one or more patterns of a first set of patterns; and a second pattern match engine configured to receive a signal of detection of the one or more patterns of the first set of patterns, and configured to detect one or more patterns of a second set of patterns.

7. The apparatus of claim 1, wherein the set of patterns includes a set of fixed strings or a set of regular expressions.

8. A method comprising:

receiving a input stream via a network;

detecting, in a first circuit, a first component of one or more patterns of a set of patterns;

signaling, by the first circuit, the detection of the first component of one or more strings;

detecting, in a second circuit, if a second component of the one or more patterns of a set of patterns immediately follows the first component in the input stream, wherein the set of patterns is recognizable as a finite state network, the finite state network including a first set of states and a second set of states, each set being associated with the first and second circuits respectively, wherein the representation of the first set of states is a deterministic finite automaton (DFA) network; and partitioning, in a third circuit, the finite state network into a first and a second network, the first network having the first set of states and the second network having the second set of states;

wherein partitioning the finite state network into the first and second networks is based, at least in part, on selection criterion of the first and second sets of states.

9. The method of claim 8, wherein the first and second circuits are configured according to a representation of the first and second sets of states, respectively.

10. The method of claim 9, wherein the representation of the second set of states is a nondeterministic finite automaton (NFA) network.

11. The method of claim 8, wherein the first circuit includes data storage that includes information characterizing the first set of states, and the second circuit includes data storage that includes information characterizing the second set of states.

12. The method of claim 8, wherein the set of patterns includes one or more of a fixed string and a regular expression.

13. A system comprising:

a source of an input stream including at least one of a disk system and a data link of a data network; and a pattern matching system configured to accept an input stream accepted by the system from the source, the pattern matching system including storage for data representing a set of patterns, including a first storage for data representing a first set of pattern components, and a second storage for data representing a second set of pattern components, each pattern of the second set of patterns corresponding to one or more components of the first set of pattern components, wherein the data representing the set of patterns includes data representing a finite state network that corresponds to the set of patterns, the data representing the finite state network further including first data representing a deterministic finite automaton (DFA) network that corresponds to the first set of pattern components;

a first pattern matcher configured to detect in an input stream a first component of one or more patterns of the set of patterns according to the data representing the first set of pattern components, and to generate a signal indicative of the detection of the first component, a second pattern matcher configured to receive the signal from the first pattern matcher and to detect, according to the data representing the second set of pattern components, if a second component of the one or more patterns of the set of patterns immediately follows the first component in the input stream; and a configuration module configured to generate the data representing the finite state network and partition the finite state network into a first and a second network, the first network having first data corresponding to the first set of pattern components and the second network having second data corresponding to the second set of pattern components;

wherein the configuration module partitions the finite state network into the first and second networks based, at least in part, on selection criterion of a first set of states and a second set of states associated with the first and second data, respectively.

14. The system of claim 13, wherein the set of patterns includes one or more of a fixed string and a regular expression.

15. The system of claim 13, wherein the data representing the finite state network further includes:
   second data representing a nondeterministic finite automaton (NFA) network that corresponds to the second set of pattern components.

* * * * *